(12) United States Patent
Nada

(10) Patent No.: US 9,895,998 B2
(45) Date of Patent: Feb. 20, 2018

(54) FUEL CELL-EQUIPPED VEHICLE AND CONTROL METHOD THEREFOR

(71) Applicant: TOYOTA JIDOSHA KABUSHIKI KAISHA, Toyota-shi, Aichi-ken (JP)

(72) Inventor: Mitsuhiro Nada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 8 days.

(21) Appl. No.: 15/093,846

(22) Filed: Apr. 8, 2016

(65) Prior Publication Data

US 2016/0311341 A1 Oct. 27, 2016

(30) Foreign Application Priority Data

Apr. 22, 2015 (JP) .................. 2015-087246

(51) Int. Cl.

| | |
|---|---|
| B60L 11/00 | (2006.01) |
| B60L 11/18 | (2006.01) |
| B60L 3/00 | (2006.01) |
| B60K 15/05 | (2006.01) |
| H01M 8/04225 | (2016.01) |
| H01M 8/04302 | (2016.01) |
| H01M 8/04694 | (2016.01) |
| H01M 8/04992 | (2016.01) |
| H01M 16/00 | (2006.01) |

(52) U.S. Cl.
CPC .......... B60L 11/1885 (2013.01); B60K 15/05 (2013.01); B60L 3/0053 (2013.01); B60L 11/1887 (2013.01); H01M 8/04225 (2016.02); H01M 8/04302 (2016.02); H01M 8/04694 (2013.01); H01M 8/04992 (2013.01); *B60K 2015/0538* (2013.01); *B60K 2015/0546* (2013.01); *B60K 2015/0576* (2013.01); *H01M 16/006* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 2015/0048644 A1* | 2/2015 | Georgi | B60K 15/05 296/97.22 |
| 2016/0152209 A1* | 6/2016 | Kojima | E05B 83/34 340/5.6 |

FOREIGN PATENT DOCUMENTS

| | | |
|---|---|---|
| JP | 2004-148980 | 5/2004 |
| JP | 2011-156896 | 8/2011 |

* cited by examiner

*Primary Examiner* — James M McPherson
(74) *Attorney, Agent, or Firm* — Finnegan, Henderson, Farabow, Garrett & Dunner, LLP

(57) ABSTRACT

A vehicle which includes a fuel cell, a receptacle, a lid, and a fixing pin, and which stores a detection of the open state during a period from a time point of a latest end of operation of the vehicle to a time point of input acceptance of a start-up instruction. If a detection of an open state has been stored in a memory at a time point of input acceptance of a start-up instruction, then the vehicle executes a retry operation of temporarily moving the fixing pin of the fixed position to the released position and thereafter moving the fixing pin again to the fixed position during an operating period of the vehicle from the time point of input acceptance of the start-up instruction.

16 Claims, 7 Drawing Sheets

FUEL CELL-EQUIPPED VEHICLE AND CONTROL METHOD THEREFOR

CROSS REFERENCE TO RELATED APPLICATIONS

This application claims priority to Japanese Patent Application No. 2015-87246 filed on Apr. 22, 2015, the entire contents of which are incorporated by reference herein.

BACKGROUND

Field

The present invention relates to a fuel cell-equipped vehicle and a control method therefor.

Related Art

JP2011-156896A teaches a fuel cell-equipped vehicle (fuel cell vehicle), which includes a receptacle (charging port) for accepting charging of a fuel from outside of the vehicle, and an openable/closable lid (lid member) for covering the receptacle. JP2004-148980A teaches a lock mechanism for fixing such a lid in a closed state.

With the fuel cell vehicles of JP2011-156896A and JP2004-148980A, there has been a possibility that the fuel cell vehicle may travel while the lid covering the receptacle is not fixed in the closed state due to a positional shift of the lid, a timing shift of the lid fixation operation effected by the lock mechanism, an irregular operation by the user, or the like. When the fuel cell vehicle travels with the lid unfixed to the closed state, the lid may be damaged when the lid having come to an open state during a travel of the fuel cell vehicle hits against an obstacle. Thus, there has been a desire for a technique that can securely prevent the lid covering the receptacle from going to the open state when the fuel cell vehicle is traveling.

SUMMARY

The present invention, having been accomplished to solve at least part of the above-described problems, it can be implemented in the following aspects.

(1) According to a first aspect of the present invention, there is provided a vehicle including a fuel cell for generating electric power by electrochemical reaction; a receptacle for accepting charging of a fuel to be used for the fuel cell from outside the vehicle; a lid which is automatically movable from an open state to a closed state and which covers the receptacle in the closed state; a fixing pin which is movable between a fixed position where the fixing pin is fitted to the lid of the closed state to fix the lid in the closed state and a released position where the fitting of the fixing pin to the lid is released; a detection part for detecting the open closed state of the lid; a fixation control part configured such that, if the detection part detects a change from the open state to the closed state, then the fixation control part performs control of moving the fixing pin from the released position to the fixed position; a start-up input part for accepting input of a start-up instruction for starting up the vehicle; a memory for storing a detection of the open state by the detection part during a period from a time point of a latest end of operation of the vehicle to a time point of input acceptance of the start-up instruction; and a retry control part configured such that, if the detection part is detecting the closed state and if the memory has stored a detection of the open state at a time point of input acceptance of the start-up instruction, then the retry control part executes a retry operation of temporarily moving the fixing pin in the fixed position to the released position and thereafter moving the fixing pin again to the fixed position, during an operating period of the vehicle from the time point of input acceptance of the start-up instruction.

According to this aspect, with a possibility that the lid is not fixed in the closed state, the fixation of the lid by the fixing pin can be executed afresh. Thus, the lid covering the receptacle can be securely prevented from being put into the open state when the vehicle is traveling.

(2) In the above aspect, the retry control part may execute the retry operation during a period from the time point of input acceptance of the start-up instruction before start-up of the vehicle.

According to this aspect, the fixation of the lid by the fixing pin can be executed afresh at a timing that is relatively less likely to cause an uncomfortable feeling to passengers of the vehicle.

(3) In the above aspect, the retry control part may execute the retry operation when the vehicle starts up.

According to this aspect, the fixation of the lid by the fixing pin can be executed afresh at a timing that is relatively less likely to cause an uncomfortable feeling to passengers of the vehicle.

(4) In the above aspect, the retry control part may execute the retry operation upon reaching a traveling speed of the vehicle to a set value.

According to this aspect, the fixation of the lid by the fixing pin can be executed afresh at a timing that is relatively less likely to cause an uncomfortable feeling to passengers of the vehicle.

(5) in the above aspect the vehicle may further include a memory erasing part for erasing the detection of the open state stored in the memory after execution of the retry operation.

According to this aspect, excessive increases in the number of times the fixing pin moves can be suppressed.

(6) In the above aspect, the retry control part may execute the retry operation a plurality of times during an operating period of the vehicle from the time point of input acceptance of the start-up instruction, and the memory erasing part may erase the detection of the open state stored in the memory after the retry operation is executed upon reaching the traveling speed of the vehicle to a set value.

According to this aspect, while excessive increases in the number of times the fixing pin moves is suppressed, the lid covering the receptacle can be further prevented from being put into the open state when the vehicle is traveling.

(7) In the above aspect, the lid may be automatically movable from the open state to the closed state by biasing force of a spring.

According to this aspect, the automatic movement of the lid from the open state to the closed state can be achieved with simplicity.

(8) In the above aspect, the vehicle may further include a release input part for accepting input of a release instruction for releasing fixation of the lid by the fixing pin when operation of the vehicle is ended; and a release control part configured such that, if input of the release instruction is accepted, then the release control part performs control of moving the fixing pin from the fixed position to the released position.

According to this aspect, the fixation of the lid by the fixing pin can be released when operation of the vehicle is ended.

The present invention may be implemented in various modes other than vehicles including a fuel cell. For example, the invention of this application may be implemented in such modes as a control method or control device for controlling a vehicle including a fuel cell.

DESCRIPTION OF THE EMBODIMENTS

Figure 1:
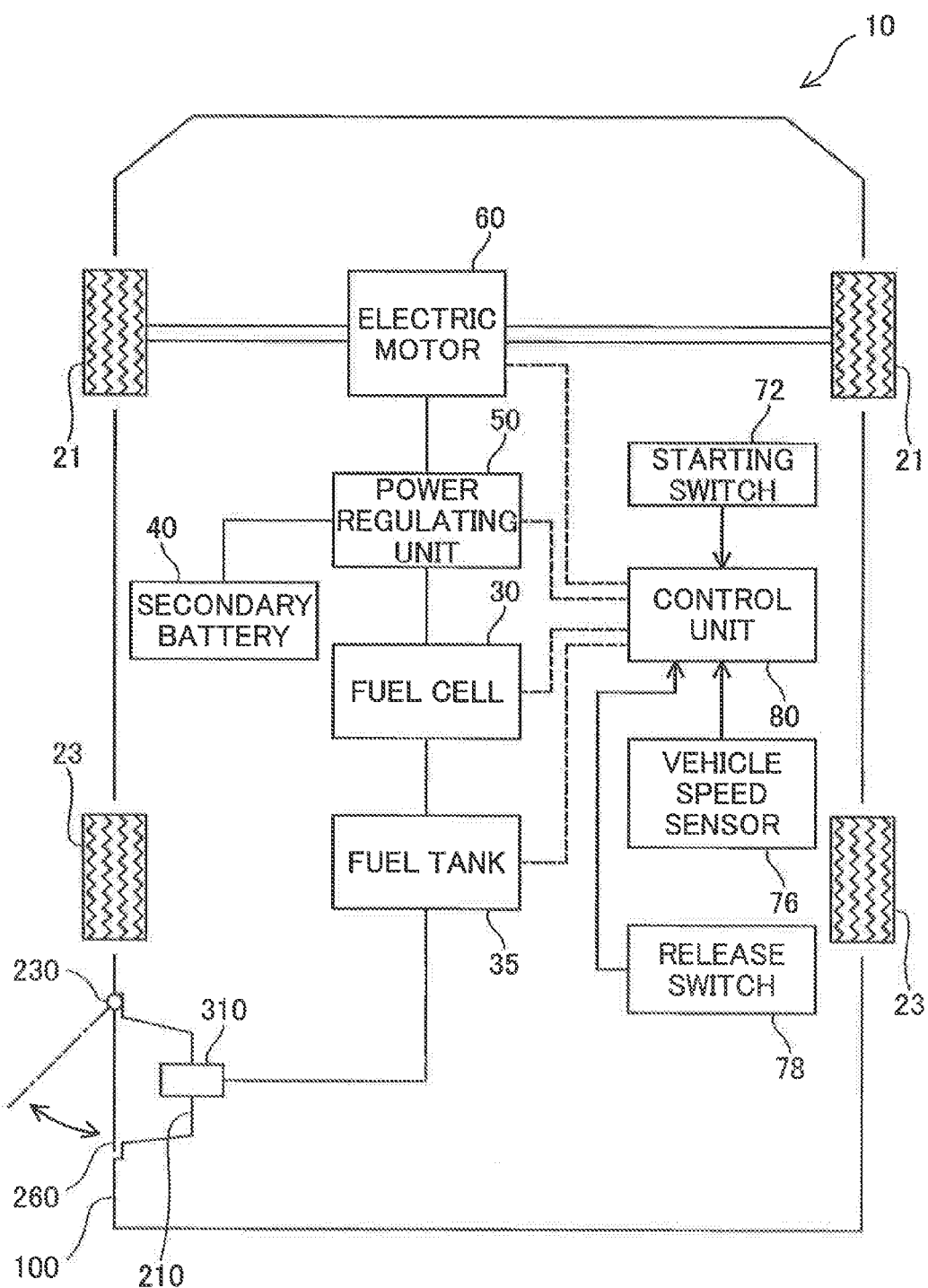
FIG. 1 is an explanatory view showing a vehicle configuration.

FIG. 1 is an explanatory view showing a configuration of a vehicle 10. The vehicle 10 is a fuel cell vehicle equipped with a fuel cell 30. The vehicle 10 travels on electric power generated by the fuel cell 30.

The fuel cell 30 of the vehicle 10 generates electric power by electrochemical reactions. In this embodiment, the fuel to be used for the fuel cell 30 is hydrogen ($H_2$). In this embodiment, the fuel cell 30 extracts electric power from the chemical energy of hydrogen, which is the fuel, through electrochemical reaction of hydrogen supplied from a fuel tank 35 and oxygen in air extracted from the atmosphere.

The vehicle 10 includes, in addition to the fuel cell 30, wheels 21, 23, a secondary battery 40, a power regulating unit 50, an electric motor 60, a starting switch 72, a vehicle speed sensor 76 a release switch 78 and a control unit 80. An outer shell 100 of the vehicle 10 is provided with a recessed portion 210, a hinge mechanism 230, a lid 260, and a receptacle 310.

The secondary battery 40 of the vehicle 10 is a battery for accumulating therein excess power. In this embodiment, the secondary battery 40 is a lithium-ion secondary battery. In other embodiments, the secondary battery 40 may be a lead storage battery or a nickel hydrogen battery.

The power regulating unit 50 of the vehicle 10 regulates supply of electric power from the fuel cell 30 to the electric motor 60, supply of electric power from the fuel cell 30 to the secondary battery 40, and the interchange of electric power between the secondary battery 40 and the electric motor 60. In this embodiment, the power regulating unit 50 includes a converter and an inverter.

The electric motor 60 of the vehicle 10 converts electric power supplied from the power regulating unit 50 into rotational mechanical power. In this embodiment, the electric motor 60 drives two wheels 21, which are front wheels of the vehicle 10, In other embodiments, the electric motor 60 may drive two wheels 23, which are rear wheels of the vehicle 10, or drive the four wheels 21, 23.

The starting switch 72 of the vehicle 10 is a user interface for accepting an operation of starting up the vehicle 10 as an operation by an operator of the vehicle 10. In this embodiment, the starting switch 72 outputs an electric signal to the control unit 80 in response to a press by the operator's finger.

The vehicle speed sensor 76 of the vehicle 10 is a sensor for detecting a traveling speed of the vehicle 10. In this embodiment, the vehicle speed sensor 76 detects a traveling speed of the vehicle 10 based on a rotation speed of the wheels 21. In this embodiment, the vehicle speed sensor 76 outputs an electric signal indicative of a traveling speed of the vehicle 10 to the control unit 80.

The release switch 78 of the vehicle 10 is a user interface for accepting an operation of releasing the fixation of the lid 260 in the closed state as an operation by the operator of the vehicle 10. In this embodiment, the release switch 78 outputs an electric signal to the control unit 80 in response to a press by the operator's finger.

The control unit 80 of the vehicle 10 controls operations of individual parts in the vehicle 10. In this embodiment, functions of the control unit 80 are implemented by operations of a CPU (Central Processing Unit) performed based on computer programs. In other embodiments, at least part of the functions of the control unit 80 may be implemented by operations of an ASIC (Application Specific Integrated Circuit) performed based on its circuit construction. Details of the control unit 80 will be described later.

The recessed portion 210 of the vehicle 10 is a site recessed inward of an outer surface of the outer shell 100. The recessed portion 210 is provided with the receptacle 310, The receptacle 310 is a charging port for accepting charging of the fuel (hydrogen) used for the fuel cell 30 from outside of the vehicle 10. In this embodiment, the receptacle 310 is provided so as to be connectable with a charging nozzle (not shown) provided in a hydrogen supply facility (hydrogen station). The fuel (hydrogen) supplied from outside of the vehicle 10 is filled into the fuel tank 35 through the receptacle 310.

The lid 260 of the vehicle 10 is a lid member which is automatically movable from an open state to a closed state and which covers the receptacle 310 in its closed state. In this embodiment, the lid 260, having a shape mutually &table to the recessed portion 210, serves in its closed state as part of the outer shell of the vehicle 10. In this embodiment, the lid 260 is provided on the outer shell 100 via a hinge mechanism 230. The hinge mechanism 230 makes the outer shell 100 and the lid 260 coupled to each other so that the lid 260 is openable and closable.

FIGS. 2, 3, 4 and 5 are explanatory views showing a detailed structure around the lid 260. In this embodiment, the lid 260 is provided so as to be automatically movable from an open state (see FIG. 4) to a closed state (see FIG. 3) by biasing force of a spring 235. In this embodiment, the spring 235 is a torsion spring provided in the hinge mechanism 230. In other embodiments, the lid 260 may be provided so as to be automatically movable from an open state to a closed state by the self weight of the lid 260.

In this embodiment, the hinge mechanism 230 also functions as a switch that outputs an electric signal indicative of an open/closed state of the lid 260 to the control unit 80. In this embodiment, the hinge mechanism 230 is designed in such a structural specification that even if the lid. 260 is in an incompletely closed state (see FIG. 5), the hinge mechanism 230 outputs an electric signal indicative of a closed state of the lid 260 to the control unit 80.

In this embodiment, the vehicle 10 has a courtesy switch 240 as a component provided near the lid 260. The courtesy switch 240, which is a switch with a spring incorporated therein, is provided so as to be retainable in each of a constricted state and an expanded state. When the courtesy switch 240 in the constricted state is pressed, the courtesy switch 240 is put into an expanded state, retaining the expanded state as it is (see FIG. 4). When the courtesy switch 240 in the expanded state is pressed, the courtesy switch 240 is put into a constricted state, retaining the constricted state as it is (see FIGS. 3 and 5). In this embodiment, the courtesy switch 240 outputs an electric signal indicative of each state, the constricted state or the expanded state, to the control unit 80.

The vehicle 10 has a lock mechanism 250 as a component provided near the lid 260. The lock mechanism 250 is a mechanism for fixing the lid 260 in the closed state. The lock mechanism 250 includes a rod-like fixing pin 225. The fixing pin 225 is movable between a fixed position where the fixing pin 225 is fitted to the lid 260 of the closed state so that the lid 260 is fixed in the closed state (see FIG. 2), and a released position where the fitting of the fixing pin 225 to the lid 260 is released (see FIG. 3). In this embodiment, the lock mechanism 250 drives a rack and pinion by a motor to move the fixing pin 225 between the fixed position and the released position. In other embodiments, the lock mechanism 250 may drive a solenoid actuator to move the fixing pin 225 between the fixed position and the released position.

In this embodiment, a protruding portion 262 having a through hole 264 is formed inside the lid 260. In this embodiment, the fixing pin 225 can be inserted into the through hole 264 while the lid 260 is in the closed state.

Figure 2:
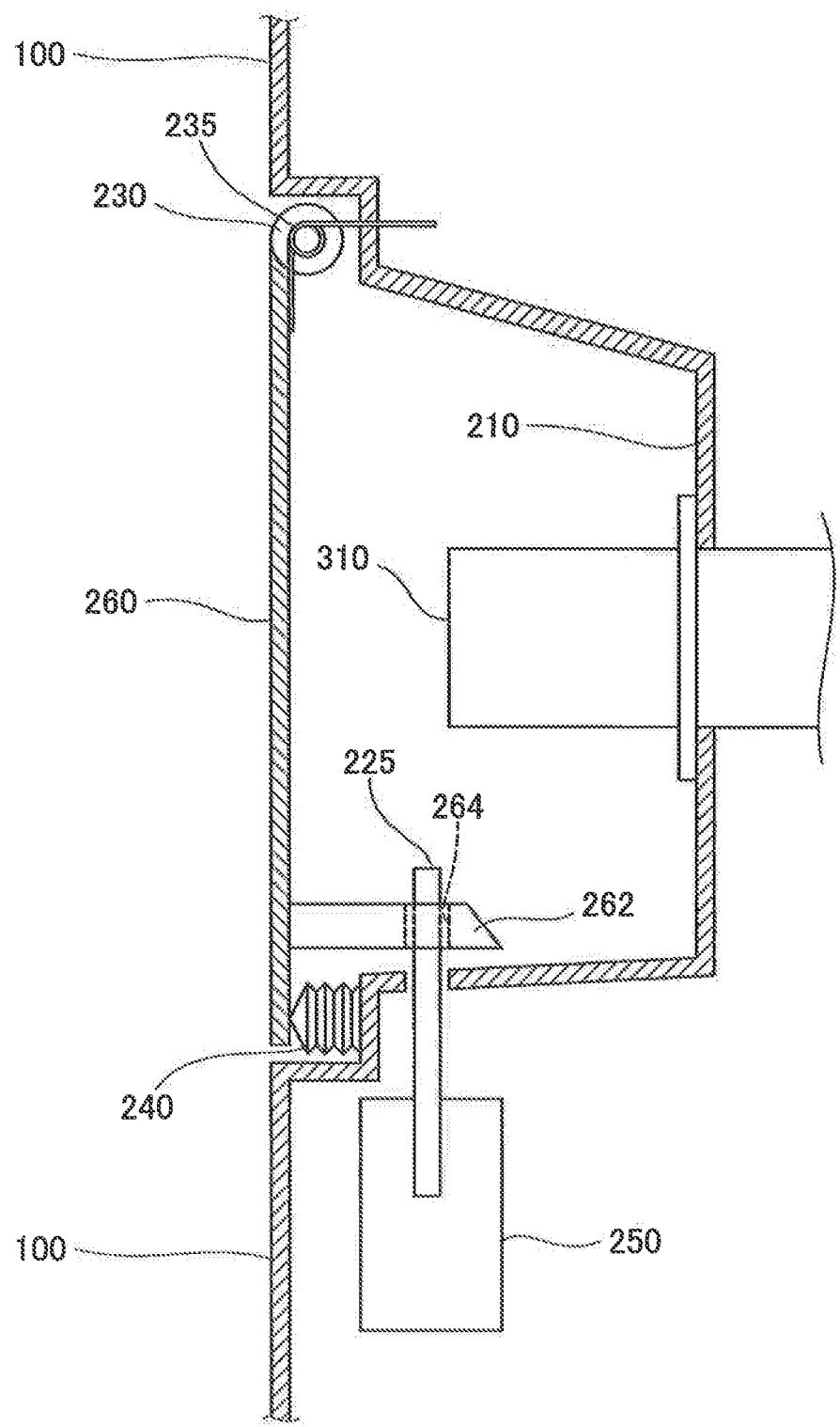
FIG. 2 is an explanatory view showing a detailed structure around a lid.

In FIG. 2, the lid 260 is in the closed state, with the fixing pin 225 in the fixed position. As a result, the lid 260 is fixed in the closed state. In FIG. 2, the courtesy switch 240 is in the constricted state. In this embodiment, while the lid 260 is in the position of FIG. 2, the hinge mechanism 230 outputs an electric signal indicative of the closed state of the lid 260 to the control unit 80.

Figure 3:
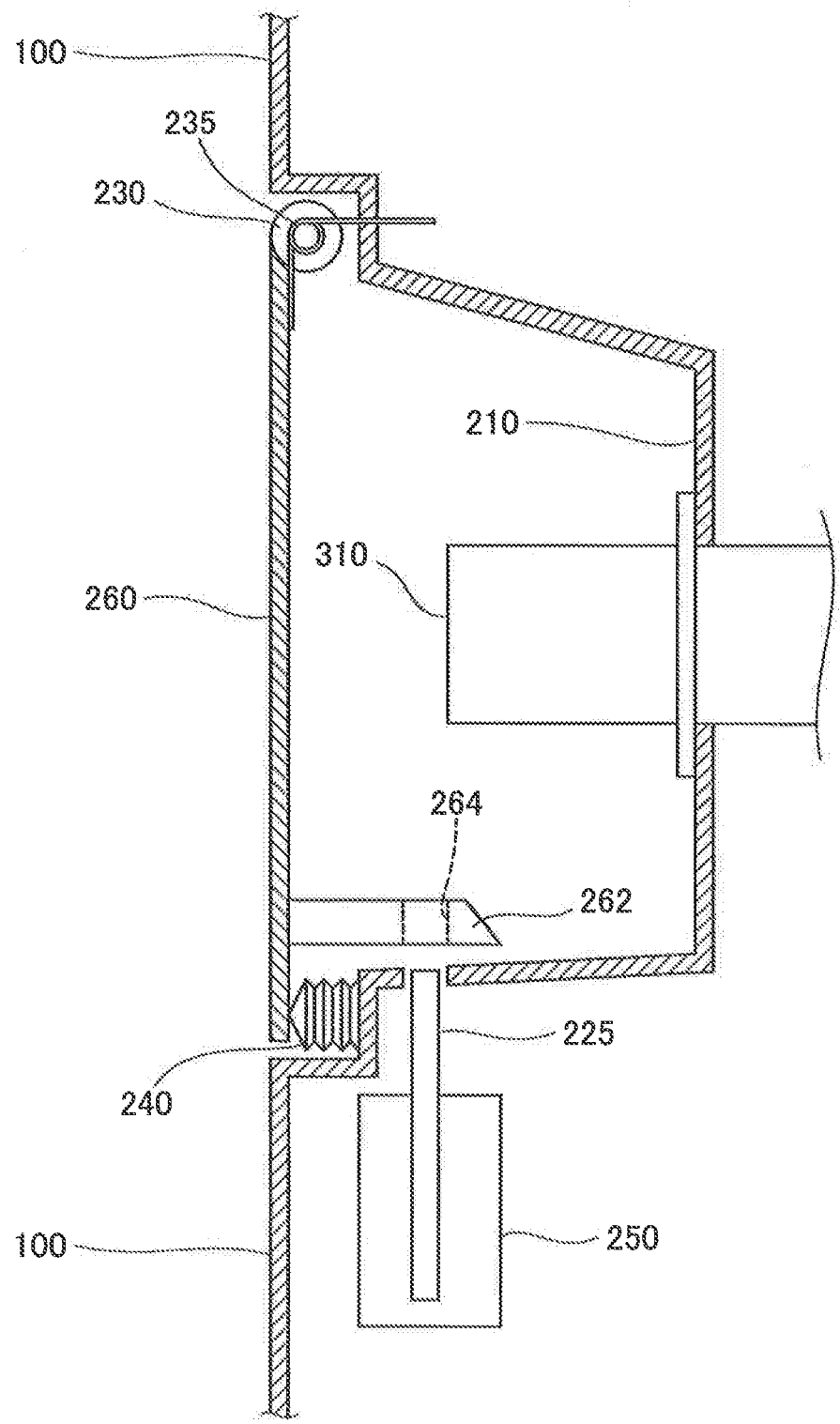
FIG. 3 is an explanatory view showing a detailed structure around the lid.

In FIG. 3, the lid 260 is in the closed state, with the fixing pin 225 in the released position. As a result, the operator is allowed to put the lid 260 into the open state (see FIG. 4). In FIG. 3, the courtesy switch 240 is in the constricted state. In this embodiment, while the lid 260 is in the position of FIG. 3, the hinge mechanism 230 outputs an electric signal indicative of the closed state of the lid 260 to the control unit 80. In this embodiment, the operator can put the lid 260 into the open state by once pressing the lid 260 inward so that the courtesy switch 240 in the constricted state is set to the expanded state.

Figure 4:
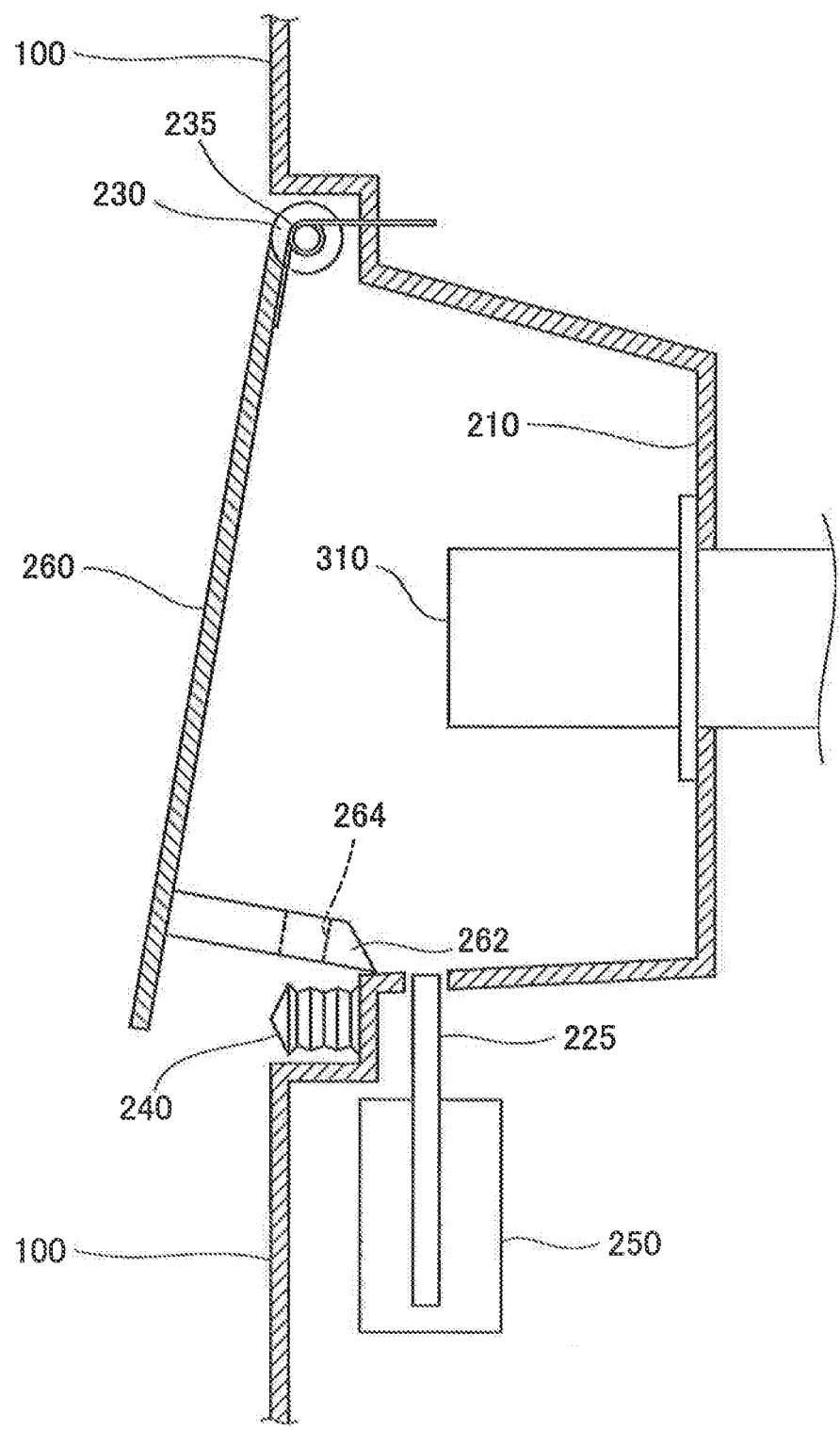
FIG. 4 is an explanatory view showing a detailed structure around the lid.

In FIG. 4, the lid 260 is in the open state, with the fixing pin 225 in the released position. In FIG. 4, the courtesy switch 240 is in the expanded state. By further opening the lid 260, the operator is allowed to fulfill the charging of the fuel through the receptacle 310. In FIG. 4, the courtesy switch 240 is in the expanded state. In this embodiment, while the lid 260 is in the position of FIG. 4, the hinge mechanism 230 outputs an electric signal indicative of the open state of the lid 260 to the control unit 80.

Figure 5:
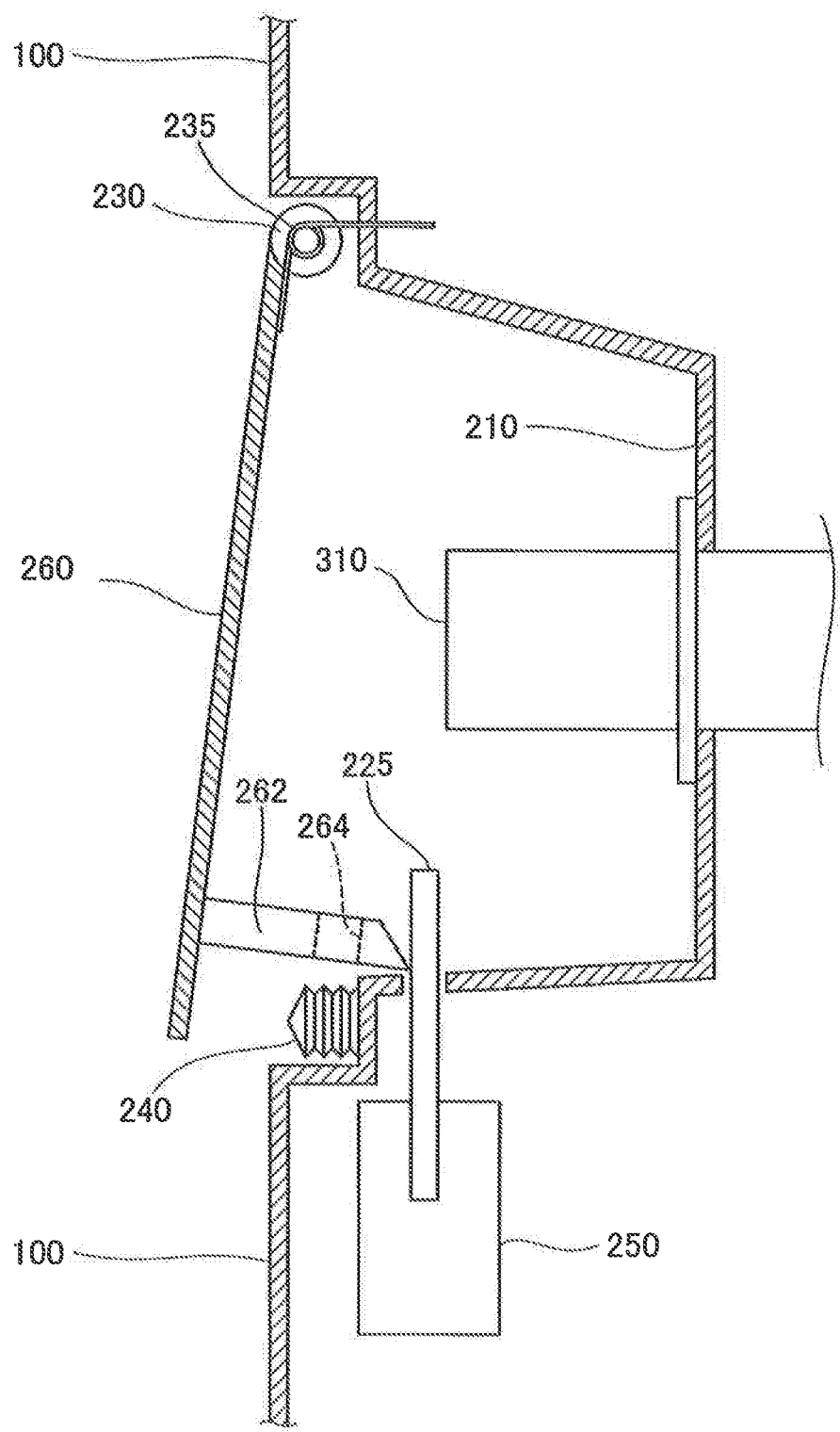
FIG. 5 is an explanatory view showing a detailed structure around the lid.

In FIG. 5, the lid 260 is in the open state, with the fixing pin 225 in the fixed position and with the protruding portion 262 of the lid 260 in contact with the fixing pin 225, In FIG. 5, the courtesy switch 240 is in the constricted state. In this embodiment, with the lid 260 in the position of FIG. 5, whereas the lid 260 is in the open state, the hinge mechanism 230 outputs an electric signal indicative of the closed state of the lid 260 to the control unit 80.

Figure 6:
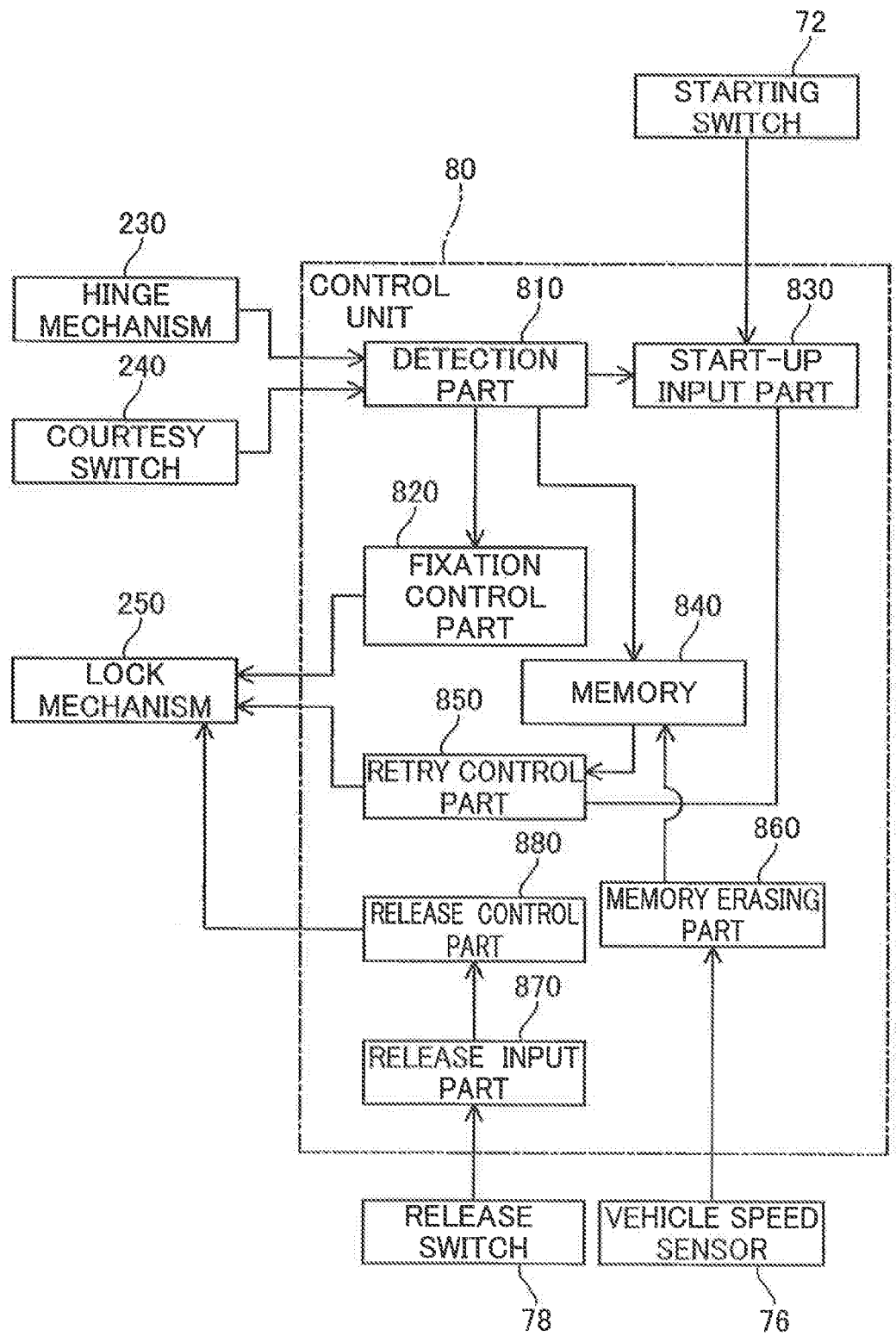
FIG. 6 is an explanatory view showing a detailed configuration of a control unit.

FIG. 6 is an explanatory view showing a detailed configuration of the control unit 80. The control unit 80 includes a detection part 810, a fixation control part 820, a start-up input part 830, a memory 840, and a retry control part 850. In this embodiment, the control unit 80 further includes a memory erasing part 860, a release input part 870, and a release control part 880.

The detection part, 810 of the control unit 80 detects an open/closed state of the lid 260. In this embodiment, the detection part 810 detects an open/closed state of the lid 260 based on electric signals outputted from the hinge mechanism 230 and the courtesy switch 240. In other embodiments, the detection part 810 may detect an open/closed state of the lid 260 based on an electric signal outputted from one of the hinge mechanism 230 and the courtesy switch 240. In this embodiment, on condition that electric signals outputted from both the hinge mechanism 230 and the courtesy switch 240 are indicative of the closed state of the lid 260, the detection part 810 decides that the lid 260 is in the closed state. In this embodiment, on condition that an electric signal outputted from at least one of the hinge mechanism 230 and the courtesy switch 240 is indicative of the open state of the lid 260, the detection part 810 decides that the lid is in the open state.

When the detection part 810 has detected a change from the open state to the closed state of the lid 260, the fixation control part 820 of the control unit 80 performs the control of moving the fixing pin 225 from the released position to the fixed position. In this embodiment, the fixation control part 820 outputs a control signal to the lock mechanism 250 to move the fixing pin 225 from the released position to the fixed position. The lid 260, when having changed from the state of FIG. 4 to the state of FIG. 3 by action of the fixation control part 820, turns into the state of FIG. 2.

When the detection part 810 has detected the closed state of the lid 260, the start-up input part 830 of the control unit 80 accepts input of a start-up instruction for starting up the vehicle 10. In this embodiment, the start-up input part 830 accepts input of a start-up instruction based on an electric signal supplied from the starting switch 72. In this embodiment, the terms "starting up the vehicle 10" refer to turning on the power of equipment necessary for traveling of the vehicle 10 so that the driver is enabled to drive the vehicle 10.

The memory 840 of the control unit 80 stores a detection of the open state of the lid 260 by the detection part 810 during a period from the latest end of operation of the vehicle 10 to acceptance of input of a start-up instruction by the start-up input part 830. In this embodiment, the terms "end of operation of the vehicle 10" refer to turning off the power of equipment necessary for traveling of the vehicle 10 so that the vehicle 10 is kept on standby until the next start-up.

On condition that the memory 840 has stored a detection of the open state of the lid 260 at a time point when input of a start-up instruction is accepted by the start-up input part 830, the retry control part 850 of the control unit 80 executes a retry operation of temporarily moving the fixing pin 225 of the fixed position to the released position and thereafter moving the fixing pin 225 again to the fixed position during an operating period of the vehicle 10 after the time point of the input acceptance of the start-up instruction by the start-up input part 830. In this embodiment, the retry control part 850 outputs a control signal to the lock mechanism 250 to execute the retry operation of the fixing pin 225. By the action of the retry control part 850, the lid 260, even if in the state of FIG. 5, comes to the state of FIG. 3, and then turns into the state of FIG. 2. In this embodiment, the terms "operating period of the vehicle 10" refer to a period during which equipment necessary for traveling of the vehicle 10 are kept fed with power supply so that the vehicle 10 is maintained in a driver's driving-enabled state. For example, the "operating period of the vehicle 10" includes a state in which the vehicle 10 is traveling and moreover includes a state in which although equipment necessary for traveling of the vehicle 10 are kept fed with power supply, yet the vehicle 10 is not traveling (at a stop).

After the retry operation has been executed by the retry control part 850, the memory erasing part 860 of the control unit 80 erases the detection of the open state of the lid 260 stored in the memory 840. In this embodiment, the retry control part 850 executes the retry operation when the traveling speed of the vehicle 10 reaches a set value, and then the memory erasing part 860 erases the detection of the open state of the lid 260 stored in the memory 840. In this embodiment, the memory erasing part 860 determines a traveling speed of the vehicle 10 based on an electric signal outputted from the vehicle speed sensor 76. In this embodiment, the retry control part 850 executes the retry operation when the traveling speed of the vehicle 10 reaches 3 km (kilometers) per hour, and then the memory erasing part 860 erases the detection of the open state of the lid 260 stored in the memory 840.

With the operation of the vehicle 10 ended, the release input part 870 of the control unit 80 accepts input of a release instruction for releasing the fixation of the lid 260 by the fixing pin 225. In this embodiment, the memory erasing part 860 accepts input of a release instruction based on an electric signal supplied from the release switch 78.

When input of a release instruction is accepted by the release input part 870, the release control part 880 of the control unit 80 performs control of moving the fixing pin 225 from the fixed position to the released position. In this embodiment, the release control part 880 outputs a control signal to the lock mechanism 250 to move the fixing pin 225 from the fixed position to the released position. By the action of the release control part 880, the lid 260 is turned from the state of FIG. 2 to the state of FIG. 3.

Figure 7:
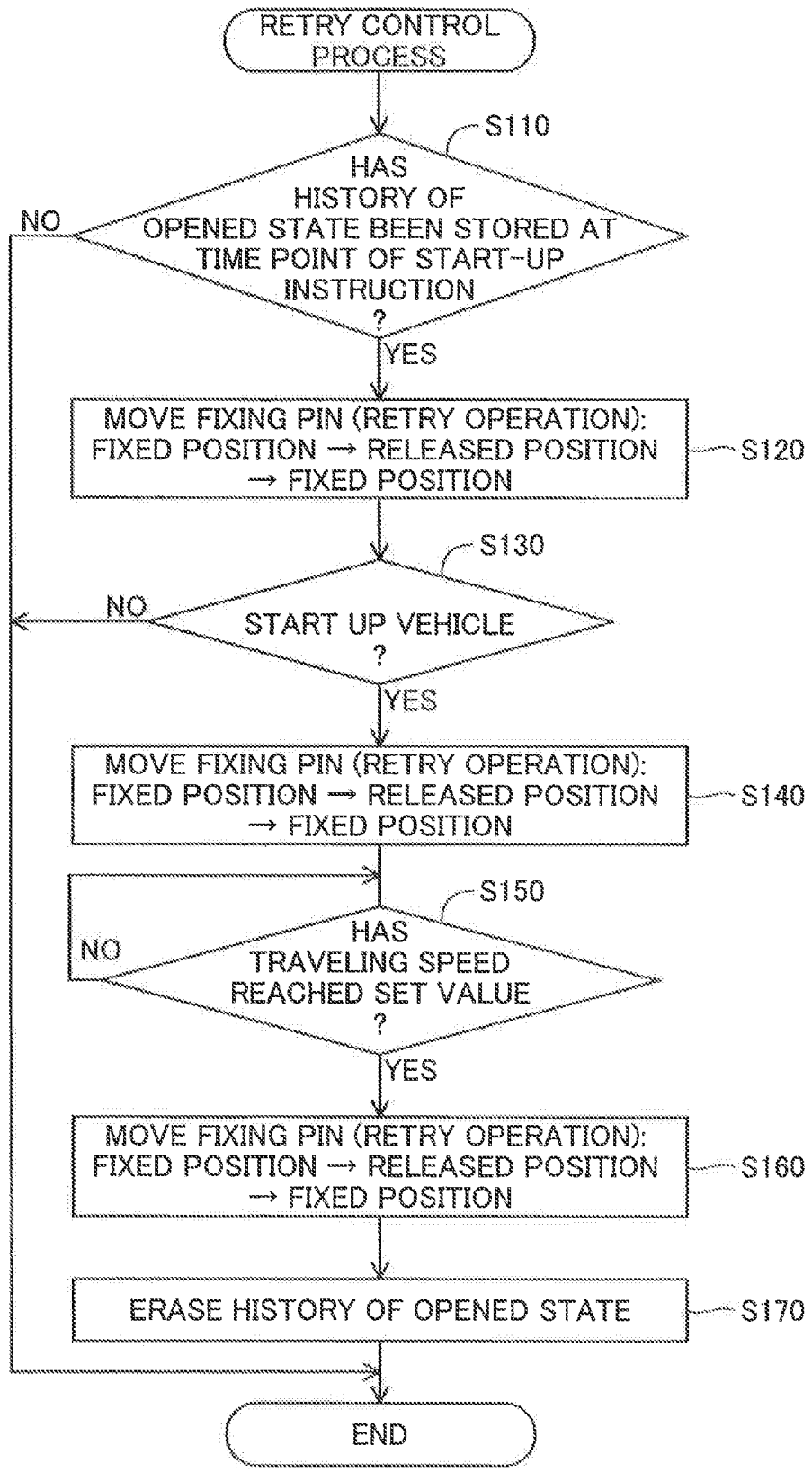
FIG. 7 is a flowchart showing retry control process to be executed by the control unit.

FIG. 7 is a flowchart showing retry control process to he executed by the control unit 80. When input of a start-up instruction is accepted by the start-up input part 830, the control unit 80 starts up the retry control process of FIG. 7.

After the start of the retry control process of FIG. 7, at a time point when input of a start-up instruction is accepted by the start-up input part 830, the control unit 80 decides whether or not the memory 840 has stored a detection of the open state of the lid 260, i.e., decides whether or not the memory 840 has a history of the open state (step S110). If the memory 840 has no history of the open state ('NO' in step S110), the control unit 80 ends the retry control process of FIG. 7.

If the memory 840 has a history of the open state ('YES' in step S110), the control unit 80 executes a retry operation of temporarily moving the fixing pin 225 of the fixed position to the released position and thereafter moving the fixing pin 225 again to the fixed position (step S120). In this embodiment, the control unit 80 outputs a control signal to the lock mechanism 250 to execute the retry operation of the fixing pin 225.

After the execution of the retry operation (step S120), the control unit 80 decides whether or not the vehicle 10 is started up (step S130). In this embodiment, if states of the individual parts of the vehicle 10 satisfy preset conditions, the control unit 80 starts up the vehicle 10, When the control unit 80 does not start up the vehicle 10 ('NO' in step S130), the control unit 80 ends the retry control process of FIG. 7.

When the control unit 80 starts up the vehicle 10 ('YES' in step S130), the control unit 80 executes the retry operation of temporarily moving the fixing pin 225 of the fixed position to the released position and thereafter moving the fixing pin 225 again to the fixed position (step S140). In this embodiment, the control unit 80 outputs a control signal to the lock mechanism 250 to execute the retry operation of the fixing pin 225.

After the execution of the retry operation (step S140), the control unit 80 decides whether or not the traveling speed of the vehicle 10 has reached a set value (step S150). In this embodiment, the set value is 3 km per hour.

If the traveling speed of the vehicle 10 has reached the set value ('YES' in step S150), the control unit 80 executes the retry operation of temporarily moving the fixing pin 225 of the fixed position to the released position and thereafter moving the fixing pin 225 again to the fixed position (step S160). In this embodiment, the control unit 80 outputs a control signal to the lock mechanism 250 to execute the retry operation of the fixing pin 225.

After the execution of the retry operation (step S160), the control unit 80 erases the history of the open state stored in the memory 840 (step S170). Thereafter, the control unit 10 ends the retry control process of FIG. 7.

If the operation of the vehicle 10 is stopped before the traveling speed of the vehicle 10 reaches the set value ('NO' in step S150), the history of the open state is continuously retained in the memory 840, allowing the history to be referenced in the next and following retry control processes.

According to the embodiment described above, if the memory 840 has stored a detection of the open state at a time point of input acceptance of a start-up instruction ('YES' in step S110), the control unit 80, during the operating period of the vehicle 10 from the time point of the input acceptance of the start-up instruction, executes the retry operations of temporarily moving the fixing pin 225 of the fixed position to the released position and thereafter moving the fixing pin 225 again to the fixed position (steps S120, S140, S160). Therefore, with a possibility that the lid 260 is not fixed in the closed state (see, e.g., FIG. 5), the fixation of the lid 260 by the fixing pin 225 can be executed afresh. Thus, the lid 260 covering the receptacle 310 can be securely prevented from being put into the open state during a travel of the vehicle 10. Also, excessive increases in the number of times the fixing pin 225 moves can be suppressed.

In the case where the memory 840 has stored a detection of the open state at a time point of input acceptance of a start-up instruction ('YES' in step S110), the control unit 80 executes the retry operation during a period from the time point of the input acceptance of the start-up instruction before the start-up of the vehicle 10 (step S120). Thus, the fixation of the lid 260 by the fixing pin 225 can be executed afresh at a timing that is relatively less likely to cause an uncomfortable feeling to passengers of the vehicle 10.

Also, in the case where the memory 840 has stored a detection of the open state at a time point of input acceptance of a start-up instruction ('YES' in step S110), the control unit 80 executes the retry operation at a start-up of the vehicle 10 (step S140). Thus, the fixation of the lid 260 by the fixing pin 225 can be executed afresh at a timing that is relatively less likely to cause an uncomfortable feeling to passengers of the vehicle 10. Furthermore, fixation failures of the lid 260 due to retaining of the lid 260 in the open state by the driver of the vehicle 10 can be prevented.

Also, in the case where the memory 840 has stored a detection of the open state at a time point of input acceptance of a start-up instruction ('YES' in step S110), the control unit 80 executes the retry operation when the traveling speed of the vehicle 10 reaches the set value (step S160). Thus, the fixation of the lid 260 by the fixing pin 225 can be executed afresh at a timing that is relatively less likely to cause an uncomfortable feeling to passengers of the vehicle 10. Furthermore, fixation failures of the lid 260 due to retaining of the lid 260 in the open state by a person or an on-ground fixed matter can be prevented.

Also, since the detection of the open state stored in the memory 840 is erased after execution of the retry operation (step S160), excessive increases in the number of times the fixing pin 225 moves can be suppressed.

Also, the detection of the open state stored in the memory 840 is erased after execution of the retry operation when the traveling speed of the vehicle 10 reaches the set value (step S160). Therefore, while excessive increases in the number of times the fixing pin 225 moves are suppressed, the lid 260 covering the receptacle 310 can be further prevented from being put into the open state during a travel of the vehicle 10.

The present invention is not limited to the above-described embodiment, working examples and modifications and may be implemented in various configurations unless those configurations depart from the gist of the invention. For example, technical features in the embodiments, working examples and modifications corresponding to technical features in the individual aspects described in the section of Summary of the Invention may be replaced or combined with one another, as required, in order to solve part or entirety of the above-described problems or to achieve part or entirety of the above-described advantageous effects. Moreover, those technical features may be deleted, as required, unless herein otherwise described as indispensable.

The control unit 80 does not need to execute the retry operation three times as in the above-described embodiment (steps S120, S140, S160), and the control unit 80 may execute at least one retry operation among the retry operation after a start-up instruction (step S120), the retry operation after a vehicle start-up (step S140), and the retry operation after reach to the traveling speed (step S160).

The timing of erasing the history of the open state in the memory 840 is not limited to a timing after execution of the retry operation (step S160) subsequent to reaching the traveling speed and may be a timing after another retry operation.

The member for fixing the lid 260 is not limited to the rod-like fixing pin 225 and has only to be a member (e.g., claw, screw, plate etc.) which can fix the lid 260 by engagement with the lid 260.

What is claimed is:

1. A vehicle comprising:
    a fuel cell for generating electric power by electrochemical reaction;
    a receptacle for accepting charging of a fuel to be used for the fuel cell from outside the vehicle;
    a lid which is automatically movable from an open state to a closed state and which covers the receptacle in the closed state;
    a fixing pin which is movable between a fixed position where the fixing pin fits with the lid while in the closed state to fix the lid in the closed state and a released position where fitting of the fixing pin to the lid is released;
    a detection part for detecting whether the lid is open or closed;
    a fixation control part configured such that, when the detection part detects a change from the open state to the closed state, the fixation control part performs control of moving the fixing pin from the released position to the fixed position;
    a start-up input part for accepting input of a start-up instruction for starting up the vehicle;
    a memory for storing a detection of the open state by the detection part during a period from a time point of a latest end of operation of the vehicle to a time point of input acceptance of the start-up instruction; and
    a retry control part configured such that, when the detection part is detecting the closed state and the memory has stored a detection of the open state at a time point of input acceptance of the start-up instruction, the retry control part executes a retry operation of temporarily moving the fixing pin in the fixed position to the released position and thereafter moving the fixing pin again to the fixed position, during an operating period of the vehicle from the time point of input acceptance of the start-up instruction.

2. The vehicle in accordance with claim 1, wherein the retry control part executes the retry operation during a period from the time point of input acceptance of the start-up instruction before start-up of the vehicle.

3. The vehicle in accordance with claim 1, wherein the retry control part executes the retry operation when the vehicle starts up.

4. The vehicle in accordance with claim 1, wherein the retry control part executes the retry operation upon reaching a traveling speed of the vehicle to a set value.

5. The vehicle in accordance with claim 1, further comprising:
    a memory erasing part for erasing the detection of the open state stored in the memory after execution of the retry operation.

6. The vehicle in accordance with claim 5, wherein
    the retry control part executes the retry operation a plurality of times during an operating period of the vehicle from the time point of input acceptance of the start-up instruction, and
    the memory erasing part erases the detection of the open state stored in the memory after the retry operation is executed upon reaching the traveling speed of the vehicle to a set value.

7. The vehicle in accordance with claim 1, wherein the lid is automatically movable from the open state to the closed state by biasing force of a spring.

8. The vehicle in accordance with claim 1, further comprising:
    a release input part for accepting input of a release instruction for releasing fixation of the lid by the fixing pin when operation of the vehicle is ended; and
    a release control part configured such that, when input of the release instruction is accepted, then the release control part performs control of moving the fixing pin from the fixed position to the released position.

9. A control method for controlling a vehicle which includes a fuel cell for generating electric power by electrochemical reaction, a receptacle for accepting charging of a fuel to be used for the fuel cell from outside the vehicle, a lid which is automatically movable from an open state to a closed state and which covers the receptacle in the closed state, a fixing pin which is movable between a fixed position where the fixing pin fits with the lid while in the closed state to fix the lid in the closed state and a released position where fitting of the fixing pin to the lid is released, wherein the control method comprising the steps of:
    detecting whether the lid is open or closed;
    upon detection of a change from the open state to the closed state, performing control of moving the fixing pin from the released position to the fixed position;
    accepting input of a start-up instruction for starting up the vehicle;

storing a detection of the open state during a period from a time point of a latest end of operation of the vehicle to a time point of input acceptance of the start-up instruction; and when the closed state is being detected and a detection of the open state has been stored at a time point of input acceptance of the start-up instruction, executing a retry operation of temporarily moving the fixing pin of the fixed position to the released position and thereafter moving the fixing pin again to the fixed position during an operating period of the vehicle from the time point of input acceptance of the start-up instruction.

10. The control method in accordance with claim 9, wherein the executing the retry operation is performed during a period from the time point of input acceptance of the start-up instruction before start-up of the vehicle.

11. The control method in accordance with claim 9, wherein the executing the retry operation is performed when the vehicle starts up.

12. The control method in accordance with claim 9, wherein the executing the retry operation is performed upon reaching a traveling speed of the vehicle to a set value.

13. The control method in accordance with claim 9, further comprising:

erasing the detection of the open state stored in the memory after execution of the retry operation.

14. The control method in accordance with claim 13, wherein the executing the retry operation is performed a plurality of times during an operating period of the vehicle from the time point of input acceptance of the start-up instruction, and the erasing the detection of the open state stored in the memory is performed after the retry operation is executed upon reaching the traveling speed of the vehicle to a set value.

15. The control method in accordance with claim 9, wherein the lid is automatically movable from the open state to the closed state by biasing force of a spring.

16. The control method in accordance with claim 9, further comprising:

accepting input of a release instruction for releasing fixation of the lid by the fixing pin when operation of the vehicle is ended; and upon acceptance of input of the release instruction, performing control of moving the fixing pin from the fixed position to the released position.

* * * * *